(12) United States Patent
Lei

(10) Patent No.: US 12,603,009 B2
(45) Date of Patent: Apr. 14, 2026

(54) PLATOON DRIVING CONTROL METHOD AND APPARATUS, MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 142 days.

(21) Appl. No.: 18/209,177

(22) Filed: Jun. 13, 2023

(65) Prior Publication Data

US 2023/0326352 A1       Oct. 12, 2023

Related U.S. Application Data

(63) Continuation of application No. PCT/CN2022/108789, filed on Jul. 29, 2022.

(30) Foreign Application Priority Data

Aug. 2, 2021    (CN) .......................... 202110882240.9

(51) Int. Cl.
*B60W 30/14* (2006.01)
*B60W 30/165* (2020.01)
(Continued)

(52) U.S. Cl.
CPC ............. *G08G 1/22* (2013.01); *B60W 30/143* (2013.01); *B60W 30/165* (2013.01);
(Continued)

(58) Field of Classification Search
CPC ...... G08G 1/22; G08G 1/0112; G08G 1/0137; G08G 1/096725; G08G 1/096741;
(Continued)

(56) References Cited

U.S. PATENT DOCUMENTS

| 9,940,840 | B1 | 4/2018 | Schubert et al. |
| 2017/0293296 | A1 | 10/2017 | Stenneth et al. |

(Continued)

FOREIGN PATENT DOCUMENTS

| CN | 106708057 A | 5/2017 |
| CN | 108632888 A | 10/2018 |

(Continued)

OTHER PUBLICATIONS

International Search Report and Written Opinion of PCT application PCT/CN2022/108789 dated Nov. 2, 2022 including translation (15 pages).

(Continued)

*Primary Examiner* — Michael V Kerrigan
(74) *Attorney, Agent, or Firm* — Crowell & Moring LLP

(57) ABSTRACT

Embodiments of this application provide platoon driving control methods and apparatuses, a computer-readable medium, and an electronic device. The platoon driving control method includes: receiving vehicle state information reported by vehicles, the vehicle state information at least comprising platoon driving capability information of the vehicles; determining, according to the platoon driving capability information of the vehicles and expected driving routes of the vehicles, a plurality of vehicles capable of performing platoon driving; and transmitting a platoon driving control instruction to the plurality of vehicles to instruct the plurality of vehicles to form a vehicle platoon to perform platoon driving.

19 Claims, 7 Drawing Sheets

(51) Int. Cl.

| | |
|---|---|
| *B60W 30/18* | (2012.01) |
| *B60W 40/105* | (2012.01) |
| *B60W 50/00* | (2006.01) |
| *G08G 1/00* | (2006.01) |

(52) U.S. Cl.

CPC .... *B60W 30/18163* (2013.01); *B60W 40/105* (2013.01); *B60W 50/0097* (2013.01); *B60W 2552/53* (2020.02); *B60W 2554/80* (2020.02); *B60W 2556/65* (2020.02)

(58) Field of Classification Search

CPC .......... G08G 1/096775; B60W 30/143; B60W 30/165; B60W 30/18163; B60W 40/105; B60W 50/0097; B60W 2552/53; B60W 2554/80; B60W 2556/65; H04L 67/10; H04L 67/52; H04L 67/12; H04L 67/125

See application file for complete search history.

(56) References Cited

U.S. PATENT DOCUMENTS

| | | | |
|---|---|---|---|
| 2017/0344023 A1 | 11/2017 | Laubinger et al. | |
| 2020/0298882 A1 | 9/2020 | Kobayashi et al. | |
| 2021/0041893 A1 | 2/2021 | Matsumoto et al. | |
| 2021/0148715 A1 | 5/2021 | Atanasiu et al. | |
| 2021/0148717 A1* | 5/2021 | Atanasiu ........... | G01C 21/3407 |

FOREIGN PATENT DOCUMENTS

| | | | | |
|---|---|---|---|---|
| CN | 110109448 A | 8/2019 | | |
| CN | 111210614 A | 5/2020 | | |
| CN | 111459149 A | 7/2020 | | |
| CN | 111696340 A | 9/2020 | | |
| CN | 112596522 A | 4/2021 | | |
| CN | 112631287 A | 4/2021 | | |
| CN | 113442920 A | 9/2021 | | |
| CN | 114060504 A | 2/2022 | | |
| EP | 3772862 B1 * | 1/2022 | ............. | H04W 4/44 |
| WO | WO 2020/207716 A1 | 10/2020 | | |

OTHER PUBLICATIONS

Chinese Office Action with English translation, Sep. 12, 2024, pp. 1-29, issued in Chinese Application No. 202110882240.9, State Intellectual Property Office, Shenzhen, China.

Extended European Search Report, Jul. 29, 2024, pp. 1-8, issued in European Patent Application No. 22852044.1, European Patent Office, The Hague, The Netherlands.

European Office Action issued in European Application No. 22 852 044.1 dated Jan. 21, 2026 (7 pages).

* cited by examiner

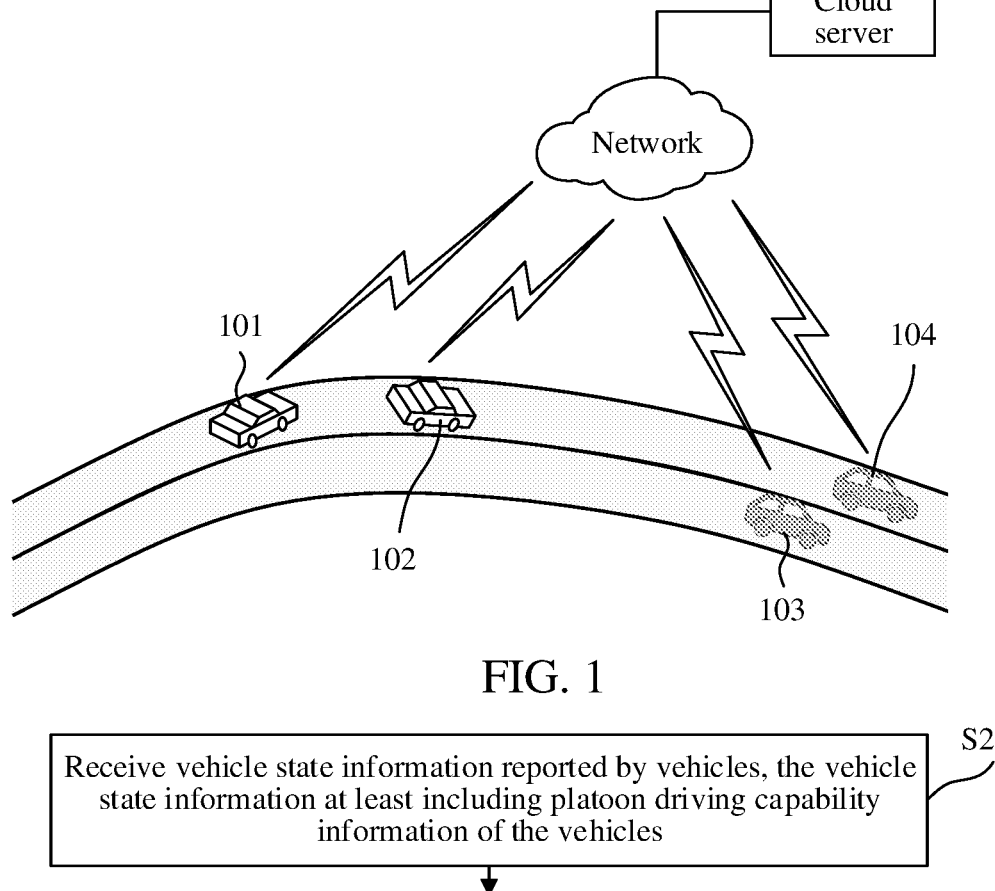

FIG. 1

| S210 |
|---|
| Receive vehicle state information reported by vehicles, the vehicle state information at least including platoon driving capability information of the vehicles |

↓

| S220 |
|---|
| Determine, according to the platoon driving capability information of the vehicles and expected driving routes of the vehicles, a plurality of vehicles capable of performing platoon driving |

↓

| S230 |
|---|
| Transmit a platoon driving control instruction to the plurality of vehicles that are determined to be capable of performing platoon driving, so as to instruct the plurality of vehicles to form a vehicle platoon to perform platoon driving |

FIG. 2

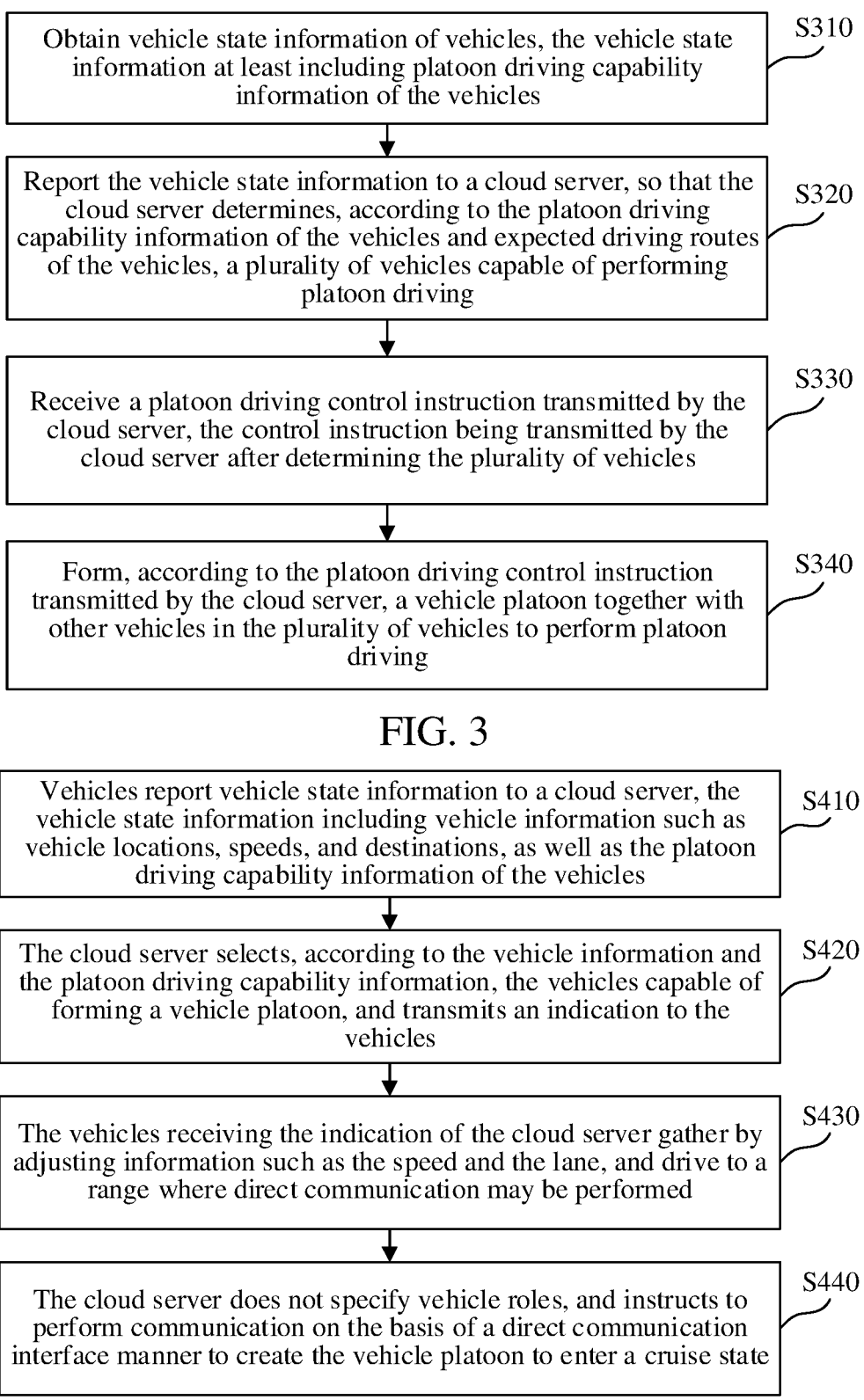

Obtain vehicle state information of vehicles, the vehicle state information at least including platoon driving capability information of the vehicles S310

Report the vehicle state information to a cloud server, so that the cloud server determines, according to the platoon driving capability information of the vehicles and expected driving routes of the vehicles, a plurality of vehicles capable of performing platoon driving S320

Receive a platoon driving control instruction transmitted by the cloud server, the control instruction being transmitted by the cloud server after determining the plurality of vehicles S330

Form, according to the platoon driving control instruction transmitted by the cloud server, a vehicle platoon together with other vehicles in the plurality of vehicles to perform platoon driving S340

FIG. 3

Vehicles report vehicle state information to a cloud server, the vehicle state information including vehicle information such as vehicle locations, speeds, and destinations, as well as the platoon driving capability information of the vehicles S410

The cloud server selects, according to the vehicle information and the platoon driving capability information, the vehicles capable of forming a vehicle platoon, and transmits an indication to the vehicles S420

The vehicles receiving the indication of the cloud server gather by adjusting information such as the speed and the lane, and drive to a range where direct communication may be performed S430

The cloud server does not specify vehicle roles, and instructs to perform communication on the basis of a direct communication interface manner to create the vehicle platoon to enter a cruise state S440

FIG. 4

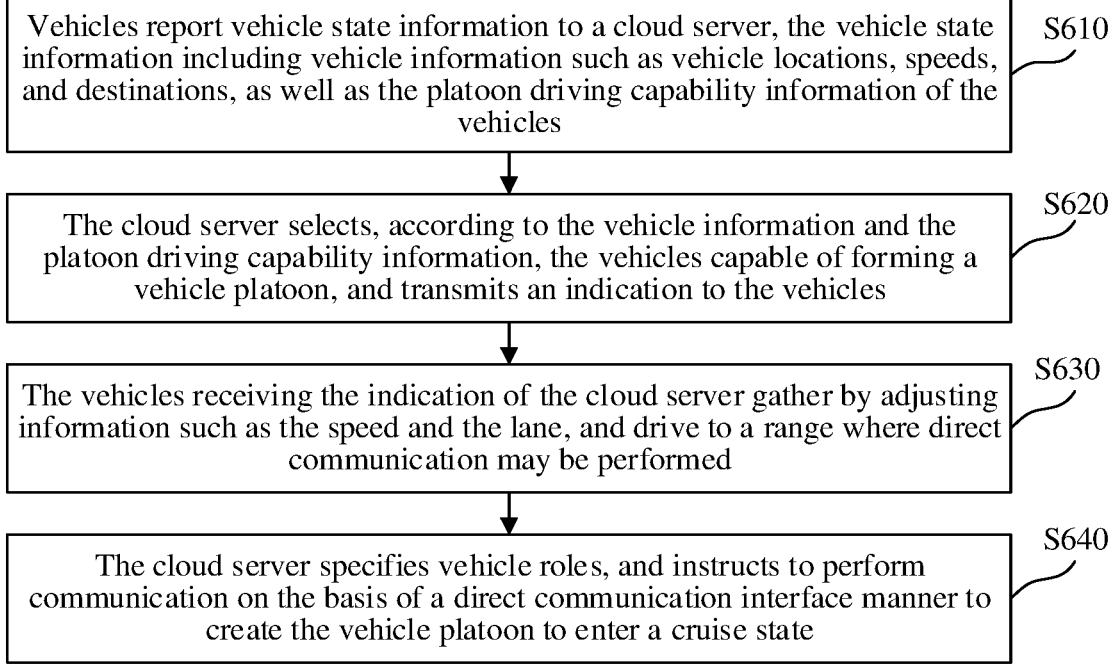

Vehicles report vehicle state information to a cloud server, the vehicle state information including vehicle information such as vehicle locations, speeds, and destinations, as well as the platoon driving capability information of the vehicles     S610

The cloud server selects, according to the vehicle information and the platoon driving capability information, the vehicles capable of forming a vehicle platoon, and transmits an indication to the vehicles     S620

The vehicles receiving the indication of the cloud server gather by adjusting information such as the speed and the lane, and drive to a range where direct communication may be performed     S630

The cloud server specifies vehicle roles, and instructs to perform communication on the basis of a direct communication interface manner to create the vehicle platoon to enter a cruise state     S640

FIG. 6

PLATOON DRIVING CONTROL METHOD AND APPARATUS, MEDIUM, AND ELECTRONIC DEVICE

RELATED APPLICATION

This application is a continuation of International Patent Application No. PCT/CN2022/108789, filed Jul. 29, 2022, which claims priority to Chinese Patent Application No. 202110882240.9 filed with China National Intellectual Property Administration on Aug. 2, 2021, and entitled "PLATOON DRIVING CONTROL METHOD AND APPARATUS, COMPUTER-READABLE MEDIUM, AND ELECTRONIC DEVICE". The contents of International Patent Application No. PCT/CN2022/108789 and Chinese Patent Application No. 202110882240.9 are each incorporated herein by reference in their entirety.

FIELD OF THE TECHNOLOGY

This application relates to the field of computer and communication technologies, and specifically, to a platoon driving control method and apparatus, a computer-readable medium, and an electronic device.

BACKGROUND OF THE DISCLOSURE

A vehicle platoon is composed of a plurality of vehicles. There are the following four vehicle roles in an application scenario of the vehicle platoon: a lead vehicle, a following vehicle, a tail vehicle (optional), and a free vehicle (optional). The lead vehicle is defined as a first vehicle in the vehicle platoon, and is used for the management work of the whole vehicle platoon, such as providing, for the following vehicle, a vehicle location, route planning, platoon procedure confirmation, and other data transmission and management. The following vehicle is defined as a vehicle behind the first vehicle in the vehicle platoon, and is an important composition vehicle of the vehicle platoon. The tail vehicle is a last vehicle in the vehicle platoon, and the role may be set according to needs, or may also be not set, and the tail vehicle is directly used as the following vehicle. The free vehicle is other vehicle outside the vehicle platoon, and does not participate in a data exchange operation in the vehicle platoon.

SUMMARY

According to an embodiment of this application, a platoon driving control method is provided, executed by a cloud server, the method including: receiving vehicle state information reported by vehicles, the vehicle state information at least including platoon driving capability information of the vehicles; determining, according to the platoon driving capability information of the vehicles and expected driving routes of the vehicles, a plurality of vehicles capable of performing platoon driving; and transmitting a platoon driving control instruction to the plurality of vehicles to instruct the plurality of vehicles to form a vehicle platoon to perform platoon driving.

According to an embodiment of this application, a platoon driving control method is provided, executed by a vehicle, the method including: obtaining vehicle state information of the vehicle, the vehicle state information at least including platoon driving capability information of the vehicle; reporting the vehicle state information to a cloud server, so that the cloud server determines, according to the platoon driving capability information of the vehicle and an expected driving route of the vehicle, a plurality of vehicles capable of performing platoon driving; receiving a platoon driving control instruction transmitted by the cloud server, the control instruction being transmitted by the cloud server after determining the plurality of vehicles; and forming, according to the control instruction, a vehicle platoon together with other vehicles in the plurality of vehicles to perform platoon driving.

According to an embodiment of this application, a platoon driving control apparatus is provided, including: a first receiving unit, configured to receive vehicle state information reported by vehicles, the vehicle state information at least including platoon driving capability information of the vehicles; a first processing unit, configured to determine, according to the platoon driving capability information of the vehicles and expected driving routes of the vehicles, a plurality of vehicles capable of performing platoon driving; and a transmitting unit, configured to transmit a platoon driving control instruction to the plurality of vehicles to instruct the plurality of vehicles to form a vehicle platoon to perform platoon driving.

According to an embodiment of this application, a platoon driving control apparatus is provided, including: a third obtaining unit, configured to obtain vehicle state information of vehicles, the vehicle state information at least including platoon driving capability information of the vehicles; a reporting unit, configured to report the vehicle state information to a cloud server, so that the cloud server determines, according to the platoon driving capability information of the vehicles and expected driving routes of the vehicles, a plurality of vehicles capable of performing platoon driving; a second receiving unit, configured to receive a platoon driving control instruction transmitted by the cloud server, the control instruction being transmitted by the cloud server after determining the plurality of vehicles; and a second processing unit, configured to form, according to the control instruction, a vehicle platoon together with other vehicles in the plurality of vehicles to perform platoon driving.

According to an embodiment of this application, a computer-readable medium is provided, storing a computer program, the computer program, when executed by a processor, implementing the platoon driving control method according to the aforementioned embodiments.

According to an embodiment of this application, an electronic device is provided, including: one or more processors; and a storage apparatus, configured to store one or more programs, the one or more programs, when executed by the one or more processors, causing the electronic device to implement the platoon driving control according to the aforementioned embodiments.

According to an embodiment of this application, a computer program product or a computer program is provided, including a computer instruction, the computer instruction being stored in a computer-readable storage medium, and a processor of a computer device reading the computer instruction from the computer-readable storage medium, and executing the computer instruction to cause the computer device to implement the platoon driving control method according to the aforementioned embodiments.

It is to be understood that the aforementioned general description and the following detailed description are merely exemplary and explanatory, and are not intended to limit this application.

BRIEF DESCRIPTION OF THE DRAWINGS

The accompanying drawings herein, which are incorporated into the specification and constitute a part of this specification, show embodiments that conform to this application, and are used for describing the principle of this application together with this specification. Apparently, the accompanying drawings described below are merely some embodiments of this application, and persons of ordinary skill in the art may further obtain other accompanying drawings according to the accompanying drawings without creative efforts. In the accompanying drawings:

FIG. 1 is a schematic diagram of an application scenario according to an embodiment of this application.

FIG. 2 is a flowchart of a platoon driving control method according to an embodiment of this application.

FIG. 3 is a flowchart of a platoon driving control method according to an embodiment of this application.

FIG. 4 is a flowchart of a platoon driving control method according to an embodiment of this application.

FIG. 6 is a flowchart of a platoon driving control method according to an embodiment of this application.

DESCRIPTION OF EMBODIMENTS

Figure 5:
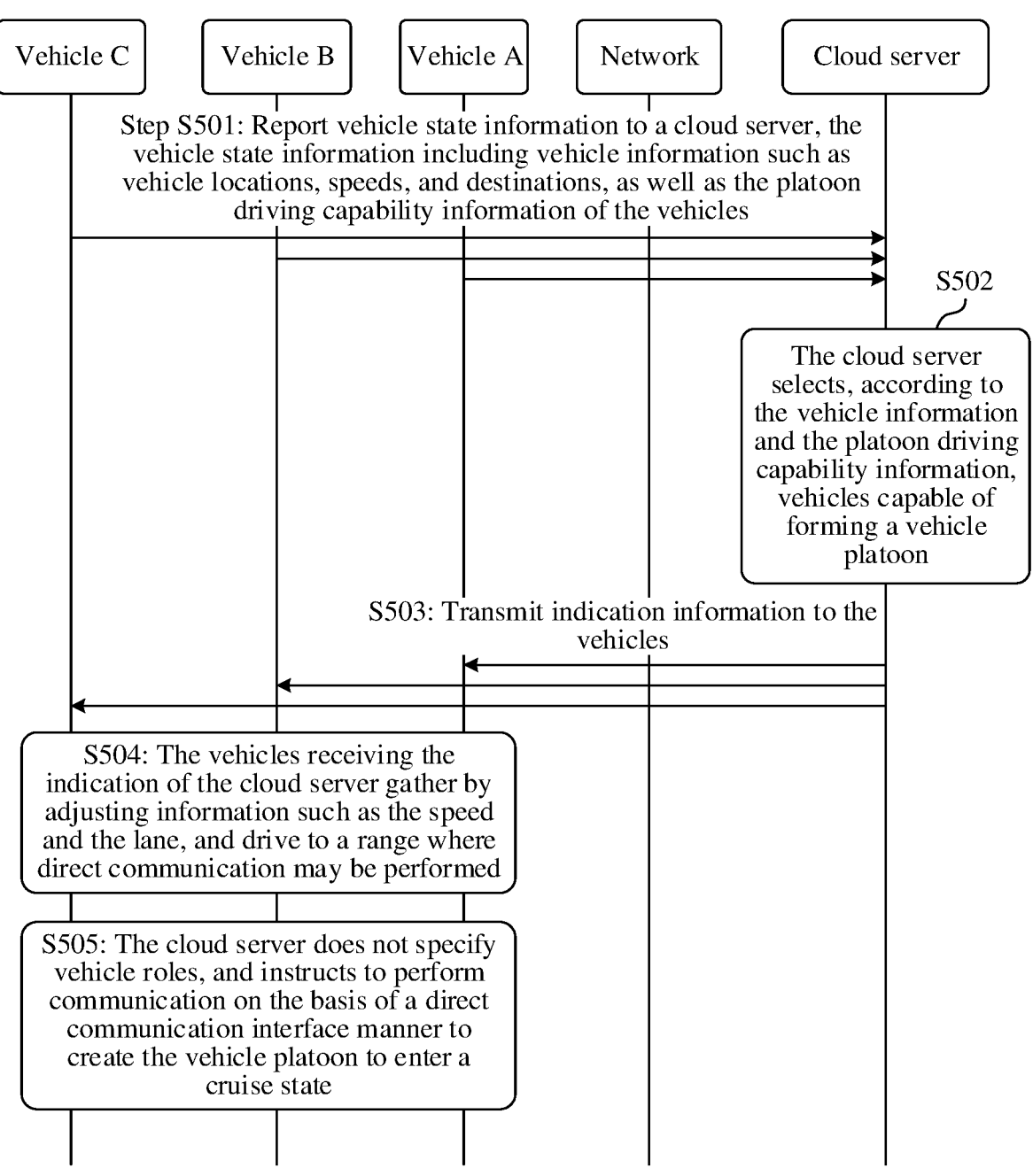
FIG. 5 is a flowchart of a platoon driving control method according to an embodiment of this application.

Exemplary implementations will now be described more thoroughly with reference to the accompanying drawings. However, the examples of implementations may be implemented in multiple forms, and it is not to be understood as being limited to these examples. Conversely, these implementations are provided to make this application more comprehensive and complete, and comprehensively convey the concept of the examples of the implementations to a person skilled in the art.

In addition, the features, structures or characteristics described in this application may be combined in one or more embodiments in any appropriate manner. In the following description, a lot of specific details are provided to give a full understanding of the embodiments of this application. However, a person skilled in the art is to be aware that when the technical solutions of this application are implemented, it is not need to use all detail features in the embodiments, one or more particular details can be omitted, or another method, element, apparatus, or step may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary description, do not need to include all content and operations/steps, and do not need to be performed in the described orders, either. For example, some operations/steps may be further divided, while some operations/steps may be combined or partially combined. Therefore, an actual execution order may be changed according to an actual situation.

It is to be that: "a plurality of" mentioned in the specification means two or more. "And/or" describes an association relationship of associated objects and represents that there may be three relationships, for example, A and/or B may represent that: A exists separately, both A and B exist, and B exists separately. The character "/" generally indicates an "or" relationship between the associated objects.

In related technologies, a vehicle platoon is generally spontaneously formed by offline vehicles, but this manner has large limitations and is difficult to satisfy the scenario requirements for platoon driving.

The embodiments of this application provide a platoon driving control method and apparatus, a computer-readable medium, and an electronic device, and at least can improve the flexibility of platoon driving to a certain extent, and can further better optimize the traffic efficiency and satisfy the requirements for various platoon driving scenarios.

FIG. 1 is a schematic diagram of an application scenario of a platoon driving control method provided according to an embodiment of this application.

In the application scenario shown in FIG. 1, there are a plurality of vehicles driving on a road, such as a vehicle 101, a vehicle 102, a vehicle 103, and a vehicle 104 (the quantity is merely illustrative). The vehicle 101 and the vehicle 102 are located within a range where direct communication may be performed, the vehicle 103 and the vehicle 104 are located within a range where direct communication may be performed, but the vehicle 101 and the vehicle 103, the vehicle 101 and the vehicle 104, the vehicle 102 and the vehicle 103, and the vehicle 102 and the vehicle 104 are not located with the ranges where direct communication may be performed.

Sensors, such as a laser sensor, a visual sensor, a speed sensor, an acceleration sensor, a location sensor, and a radar, may be installed on each vehicle. The vehicles may share sensor data, for example, sharing data measured by the laser sensor, image data measured by the visual sensor, speed data measured by the speed sensor, acceleration data measured by the acceleration sensor, location data measured by the location sensor, and the detection data of the radar. In some embodiments, the vehicles may share the sensor data through a PC5 link, or may also share the sensor data through Uu communication. Vehicle to everything (V2X) information exchange communication modes include: communication interaction of vehicle to vehicle (V2V), vehicle to pedestrian (V2P), vehicle to infrastructure (V2I), and vehicle to network (V2N). The V2X communication mode includes two communication interfaces: PC5 and Uu. PC5 may also be referred to as a direct communication interface, and is a short-distance direct communication interface among a vehicle, a pedestrian, and a road infrastructure. Uu may also be referred to as a cellular network communication interface, and is a communication interface between a terminal and a base station.

In one embodiment of this application, each vehicle (e.g., the vehicle 101, the vehicle 102, the vehicle 103, and the vehicle 104 shown in FIG. 1) may report the vehicle state information of the vehicle to a cloud server through a network. The vehicle state information at least includes the platoon driving capability information of the vehicle, for example, whether the vehicle has a platoon driving capability, and whether the vehicle allows platoon driving. After receiving the vehicle state information reported by a plurality of vehicles, the cloud server may determine, according to the vehicle state information reported by the plurality of vehicles and the expected driving routes of the vehicles, a plurality of vehicles capable of performing platoon driving, and then transmit a platoon driving control instruction to the plurality of vehicles to instruct the plurality of vehicles to form a vehicle platoon to perform platoon driving.

Specifically, in event that it is determined that the vehicle 101, the vehicle 102, the vehicle 103, and the vehicle 104 shown in FIG. 1 can perform platoon driving, the cloud server may transmit the platoon driving control instruction to the vehicle 101, the vehicle 102, the vehicle 103, and the vehicle 104 to instruct the plurality of vehicles to form the vehicle platoon to perform platoon driving.

In some embodiments, the control instruction includes location indication information, and thus, the plurality of vehicles may drive to a location indicated by the location indication information and then establish a communication connection to form the vehicle platoon.

In some embodiments, the control instruction may include speed indication information and lane indication information, the speed indication information is used for indicating that the plurality of vehicles adjust a driving speed according to the speed indication information, and the lane indication information is used for indicating that the plurality of vehicles drive to an indicated lane, and thus, the plurality of vehicles may enter a certain region by adjusting the speed and the lane so as to establish the communication connection to form the vehicle platoon.

In some embodiments, the cloud server may determine, by using an artificial intelligence (AI) technology, whether the plurality of vehicles are suitable for performing platoon driving. The AI technology is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

Moreover, the AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, is machine vision that uses a camera and a computer to replace human eyes to perform recognition, tracking, measurement and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies, such as image processing, image recognition, image semantic understanding, image retrieval, optical character recognition (OCR), video processing, video semantic understanding, video content/behavior recognition, threedimensional (3D) object reconstruction, a 3D technology, virtual reality, augmented reality, synchronous positioning, and map construction, and further include biometric feature recognition technologies, such as common face recognition and fingerprint recognition.

It is to be that the cloud server in the embodiment of this application may be an edge cloud server, and may also be a central cloud server. As the name implies, the edge cloud server is a server closer to an edge end, for example, being disposed at a roadside, to nearby provide a service to improve a data response speed. With respect to the edge cloud server, the central cloud server is disposed at a distal end and may provide a service in a larger range.

Hence, on the basis of the technical solution of the embodiment shown in FIG. 1, the cloud server may comprehensively assess, according to the related information (the vehicle state information and the expected driving routes, etc.) of the vehicles, the vehicles capable of performing platoon driving, and thus, the flexibility of platoon driving is improved, the traffic efficiency can be better optimized, and the requirements for various platoon driving scenarios can be satisfied.

The implementation details of the technical solution of the embodiment of this application are described below in detail.

FIG. 2 is a flowchart of a platoon driving control method according to an embodiment of this application. The platoon driving control method may be executed by a server. The server may be the cloud server shown in FIG. 1. With reference to FIG. 2, the platoon driving control method at least includes steps S210 to S230. Detailed description is as follows:

At step S210: Receive vehicle state information reported by vehicles, the vehicle state information at least including platoon driving capability information of the vehicles.

In one embodiment of this application, the platoon driving capability information of the vehicles may include the information whether the vehicles have a platoon driving capability information and whether the vehicles allow platoon driving.

In some embodiments, the vehicle state information may further include one or more of the following information: vehicle location information, vehicle speed information, lane information, vehicle acceleration information, an expected driving route of the vehicle and the like.

At step S220: Determine, according to the platoon driving capability information of the vehicles and expected driving routes of the vehicles, a plurality of vehicles capable of performing platoon driving.

In one embodiment of this application, the cloud server may receive the expected driving routes reported by the vehicles. Alternatively, the cloud server may also obtain the expected driving routes of the vehicles from a route planning server requested by the vehicles. For example, the vehicles request, from the server of a certain map application, a route to a specified destination, and then the cloud server may obtain the expected driving routes of the vehicles by communicating with the server.

In some embodiments of this application, the cloud server may also obtain a destination address reported by the vehicles and then plan routes to the destination address as the expected driving routes.

In some embodiments, the cloud server may further predict, according to recognized driving trajectories of the vehicles, the expected driving routes of the vehicles. For example, the cloud server determines the driving trajectories of the vehicles according to the location information reported by the vehicle multiple times, and then may predict, on the basis of the driving trajectories, the expected driving routes of the vehicles according to road sections where the vehicle drive, and the historical driving conditions of the vehicles. Alternatively, the cloud server may also recognize the driving trajectories of the vehicles according to perception information collected by a roadside perception device (e.g., a roadside camera), and further predict the expected driving routes of the vehicles.

In some embodiments of this application, in event that the platoon driving capability information of the vehicles is used for indicating whether the vehicles have the platoon driving capability, then the process of determining, by the cloud server according to the platoon driving capability information of the vehicles and the expected driving routes of the vehicles, the plurality of vehicles capable of performing platoon may include: determining that the plurality of vehicles are capable of performing platoon driving in response to determining, according to the vehicle state information, that the plurality of vehicles have the platoon driving capability and the expected driving routes of the plurality of vehicles are overlapped.

Specifically, for example, the vehicle 101, the vehicle 102, the vehicle 103, and the vehicle 104 shown in FIG. 1 all traverse a certain road section and all have the platoon driving capability. In such a situation, then even though the final destinations of these vehicles are different, the vehicles may form a vehicle platoon to perform platoon driving within the road section which the vehicles traverse together.

In some embodiments of this application, the platoon driving capability information is used to indicate whether the vehicles have the platoon driving capability and whether the vehicles allow platoon driving. In such of these embodiments, the process of determining, by the cloud server according to the platoon driving capability information of the vehicles and the expected driving routes of the vehicles, the plurality of vehicles capable of performing platoon may include: determining that the plurality of vehicles are capable of performing platoon driving in response to determining, according to the platoon driving capability information of the vehicles, that the plurality of vehicles have the platoon driving capability and the plurality of vehicles allow platoon driving, and the expected driving routes of the plurality of vehicles are overlapped.

Specifically, for example, the vehicle 101, the vehicle 102, the vehicle 103, and the vehicle 104 shown in FIG. 1 all traverse a certain road section and all have the platoon driving capability. However, the vehicle 104 does not allow platoon driving, while the vehicles 101, 102, and 103 each allow platoon driving. In such a situation, the vehicles 101, 102, and 103 may form a vehicle platoon to perform platoon driving within the road section which the vehicles together traverse.

In one embodiment of this application, the process of determining, by the cloud server according to the platoon driving capability information of the vehicles and the expected driving routes of the vehicles, the plurality of vehicles capable of performing platoon may include: determining target vehicles that subscribe a platoon driving service, and determining, according to the platoon driving capability information of the target vehicles and the expected driving routes of the target vehicles, the plurality of vehicles capable of performing platoon driving. In this embodiment, only the target vehicles that subscribe the platoon driving service may perform platoon driving, and reference may be made to the technical solution of the aforementioned embodiment for the process of determining, according to the platoon driving capability information of the target vehicles and the expected driving routes of the target vehicles, a plurality of vehicles capable of performing platoon driving.

In one embodiment of this application, the process of determining, by the cloud server according to the platoon driving capability information of the vehicles and the expected driving routes of the vehicles, the plurality of vehicles capable of performing platoon may include: selecting, according to location information of the vehicles, vehicles with a distance therebetween being within a set range as candidate vehicles, and determining, according to the platoon driving capability information of the candidate vehicles and the expected driving routes of the candidate vehicles, the plurality of vehicles capable of performing platoon driving. In this embodiment, in the process of selecting the vehicles for performing platoon driving, selection may be performed within a set distance range. In turn, a large range causing the time to form the vehicle platoon to be too long may be avoided. Moreover, reference may be made to the aforementioned embodiment for the process of determining, according to the platoon driving capability information of the candidate vehicles and the expected driving routes of the candidate vehicles, the plurality of vehicles capable of performing platoon driving.

In one embodiment of this application, the location information of the vehicles may be reported by the vehicles to the cloud server, and may also be obtained by the cloud server according to received road perception information. For example, the cloud server may obtain vehicle information perceived by the roadside perception device (e.g., a camera and the like), and then determine the location information of the vehicles according to the vehicle information.

With continued reference to FIG. 2, at step S230, 
transmit a platoon driving control instruction to the plurality of vehicles that are determined to be capable of performing platoon driving, so as to instruct the plurality of vehicles to form the vehicle platoon to perform platoon driving.

In one embodiment of this application, the cloud server may separately transmit, to the plurality of vehicles capable of performing platoon driving, the control instruction including speed indication information and lane indication information. The speed indication information may be used to indicating that the plurality of vehicles adjust a driving speed according to the speed indication information, and the lane indication information may be used to indicate that the plurality of vehicles drive to a lane indicated by the lane indication information, so that the plurality of vehicles may enter adjacent regions by adjusting the speed and the lane information so as to establish a communicative connection to form the vehicle platoon.

In one embodiment of this application, the cloud server may transmit, to the plurality of vehicles capable of performing platoon driving, the control instruction including location indication information. The location indication information may be used to instruct the plurality of vehicles to drive to a location indicated by the location indication information, so that the plurality of vehicles may drive to the location indicated by the location indication information to establish a communicative connection to form the vehicle platoon.

In one embodiment of this application, the cloud server may further transmit role indication information to the plurality of vehicles. The role indication information may be used to indicate a role of a specified vehicle in the plurality of vehicles, such as specifying a certain vehicle as a head vehicle. In some implementations, the role indication information may also indicate other vehicles as following vehicles. In some other implementations, the role indication information may not so indicate.

FIG. 2 describes the embodiment of this application from the perspective of the cloud server. The cloud server may be an edge cloud server, and may also be a central cloud server. The technical solutions of the embodiments of this application are described below from the perspective of the vehicle with reference to FIG. 3.

FIG. 3 is a flowchart of a platoon driving control method according to an embodiment of this application. The platoon driving control method may be executed by a vehicle. With reference to FIG. 3, the platoon driving control method at least includes steps S310 to S340. Detailed description is as follows:

At step S310: Obtain vehicle state information of the vehicle, the vehicle state information at least including platoon driving capability information of the vehicle.

In one embodiment of this application, the platoon driving capability information of the vehicle is used for indicating whether the vehicle has a platoon driving capability information and whether the vehicle allows platoon driving.

In some embodiments, the vehicle state information may further include one or more of the following information: vehicle location information, vehicle speed information, lane information, vehicle acceleration information, an expected driving route of the vehicle and the like.

At step S320: Report the vehicle state information to a cloud server, so that the cloud server determines, according to the platoon driving capability information of the vehicle and an expected driving route of the vehicle, a plurality of vehicles capable of performing platoon driving.

In some embodiments, reference may be made to the technical solution of the aforementioned embodiment for the process of determining, by the cloud server, the plurality of vehicles capable of performing platoon driving, and details are not described again.

At step S330: Receive a platoon driving control instruction transmitted by the cloud server, the control instruction being transmitted by the cloud server after determining the plurality of vehicles.

In one embodiment of this application, the cloud server may separately transmit, to the plurality of vehicles capable of performing platoon driving, the control instruction including speed indication information and lane indication information. The speed indication information may be used to indicate that the plurality of vehicles adjust a driving speed according to the speed indication information, and the lane indication information may be used to indicate that the plurality of vehicles drive to a lane indicated by the lane indication information, so that the plurality of vehicles may enter adjacent regions by adjusting the speed and the lane information so as to establish a communicative connection to form the vehicle platoon.

In one embodiment of this application, the cloud server may transmit, to the plurality of vehicles capable of performing platoon driving, the control instruction including location indication information. The location indication information may be used to instruct the plurality of vehicles to drive to a location indicated by the location indication information, so that the plurality of vehicles may drive to the location indicated by the location indication information to establish a communicative connection to form the vehicle platoon.

At step S340: Form, according to the platoon driving control instruction transmitted by the cloud server, a vehicle platoon together with other vehicles in the plurality of vehicles to perform platoon driving.

In some embodiments, in event that the platoon driving control instruction transmitted by the cloud server includes speed indication information and lane indication information, the vehicle may adjust a driving speed according to the speed indication information and adjust, according to the lane indication information, a lane where the vehicle drive, so that the vehicle may enter adjacent regions together with other vehicles and then establishes a communicative connection to form a vehicle platoon.

In event that the platoon driving control instruction transmitted by the cloud server includes the location indication information, the vehicle may drive to the location indicated by the location indication information, and may further enter adjacent regions together with other vehicles. In turn, the vehicle may establish a communicative connection to form the vehicle platoon.

In the technical solutions provided by some embodiments of this application, by determining, according to the vehicle state information of the vehicles and the expected driving routes of the vehicles, the plurality of vehicles capable of performing platoon driving, and then transmitting the platoon driving control instruction to the plurality of vehicles to instruct the plurality of vehicles to form the vehicle platoon to perform platoon driving, so that the cloud server may comprehensively assess, according to the related information (the vehicle state information and the expected driving routes, etc.) of the vehicles, the vehicles capable of performing platoon driving, and thus, the flexibility of platoon driving is improved, the traffic efficiency can be better optimized, and the requirements for various platoon driving scenarios can be satisfied.

The technical solutions of the embodiments of this application are described below from the perspective of performing interaction between the cloud server and the vehicle.

As shown in FIG. 4, the platoon driving control method according to one embodiment of this application includes the following steps:

step S410: Vehicles report vehicle state information to the cloud server, the vehicle state information including vehicle information such as vehicle locations, speeds, and destinations, as well as the platoon driving capability information of the vehicles.

Step S420: The cloud server selects, according to the vehicle information and the platoon driving capability information, the vehicles capable of forming a vehicle platoon, and transmits an indication to the vehicles.

In some embodiments, the cloud server may select, on the basis of collected vehicle state information, the vehicle information, such as the current geographical locations, speeds, lanes, and driving destinations of the vehicles, and vehicle owner identity information (e.g., whether vehicle owners subscribe a platoon driving service), and the platoon driving capability information of the vehicles, the vehicles capable of forming the vehicle platoon.

Specifically, the geographical locations are close to each other, for example, being within a range of 2 Km, expected routes decided by the driving destinations are overlapped, and the vehicle owner identity information represents that the vehicle owners may obtain a distal-end platoon service and the like, and thus, this information may be selected as the conditions of performing platoon driving. In event that the geographical locations of three vehicles are close to each other, the expected routes decided by the driving destinations are overlapped, and the vehicle owner identity information represents that the vehicle owners may obtain the distal-end platoon service and the like, and then the three vehicles may be selected to form the vehicle platoon.

Step S430: the vehicles receiving the indication of the cloud server gather by adjusting information such as the speed and the lane, and drive to a range where direct communication may be performed.

In some embodiments, apart from indicating an appropriate speed and a lane to the vehicles, the cloud server may further indicate a gathering location to the vehicles. Alternatively, the gathering location may also be separately indicated to instruct the vehicles capable of performing platoon driving to drive to the location to form the vehicle platoon.

In some embodiments, after entering the range where direct communication may be performed, the vehicles may use a PC5 mechanism to form the vehicle platoon.

Step S440: The cloud server does not specify vehicle roles, and instructs to perform communication on the basis of a direct communication interface manner to create the vehicle platoon to enter a cruise state.

The specific execution procedure of the technical solution shown in FIG. 4 is as shown in FIG. 5, including the following steps:

step S501: Vehicles (e.g., vehicle A, vehicle B, and vehicle C) report vehicle state information to a cloud server, the vehicle state information including vehicle information such as vehicle locations, speeds, and destinations, as well as the platoon driving capability information of the vehicles.

In some embodiments, the vehicles may report the vehicle information and the platoon driving capability information to the cloud server through a V2X network or a 5G network, etc.

Step S502: The cloud server selects, according to the vehicle information and the platoon driving capability information, the vehicles capable of forming a vehicle platoon.

In some embodiments, the cloud server may select, on the basis of collected vehicle state information, the vehicle information, such as the current geographical locations, speeds, lanes, and driving destinations of the vehicles, and vehicle owner identity information (e.g., whether vehicle owners subscribe a platoon driving service), and the platoon driving capability information of the vehicles, the vehicles capable of forming the vehicle platoon.

Specifically, the geographical locations are close to each other, for example, being within a range of 2 Km, expected routes decided by the driving destinations are overlapped, and the vehicle owner identity information represents that the vehicle owners may obtain a distal-end platoon service and the like, and thus, these information may be selected as the conditions of performing platoon driving. In event that the geographical locations of three vehicles are close to each other, the expected routes decided by the driving destinations are overlapped, and the vehicle owner identity information represents that the vehicle owners may obtain the distal-end platoon service and the like, and then the three vehicles may be selected to form the vehicle platoon.

Step S503: The cloud server transmits an indication to the selected vehicles capable of forming the vehicle platoon.

In some embodiments, the cloud server may indicate the speeds and the lane information to instruct the vehicle to gather by adjusting the speeds and the lane information. Of course, apart from indicating an appropriate speed and a lane to the vehicles, the cloud server may further indicate a gathering location to the vehicles. Alternatively, the gathering location may also be separately indicated to instruct the vehicles capable of performing platoon driving to drive to the location to form the vehicle platoon.

Step S504: the vehicles receiving the indication of the cloud server gather by adjusting information such as the speed and the lane, and drive to a range where direct communication may be performed.

In some embodiments, after entering the range where direct communication may be performed, the vehicles may use a PC5 mechanism to form the vehicle platoon.

Step S505: The cloud server does not specify vehicle roles, and instructs to perform communication on the basis of a direct communication interface manner to create the vehicle platoon to enter a cruise state.

As shown in FIG. 6, the platoon driving control method according to one embodiment of this application includes the following steps:

step S610: Vehicles report vehicle state information to the cloud server, the vehicle state information including vehicle information such as vehicle locations, speeds, and destinations, as well as the platoon driving capability information of the vehicles.

Step S620: The cloud server selects, according to the vehicle information and the platoon driving capability information, the vehicles capable of forming a vehicle platoon, and transmits an indication to the vehicles.

In some embodiments, the cloud server may select, on the basis of collected vehicle state information, the vehicle information, such as the current geographical locations, speeds, lanes, and driving destinations of the vehicles, and vehicle owner identity information (e.g., whether vehicle owners subscribe a platoon driving service), and the platoon driving capability information of the vehicles, the vehicles capable of forming the vehicle platoon.

Specifically, the geographical locations are close to each other, for example, being within a range of 2 Km, expected routes decided by the driving destinations are overlapped, and the vehicle owner identity information represents that the vehicle owners may obtain a distal-end platoon service and the like, and thus, this information may be selected as the conditions of performing platoon driving. In event that the geographical locations of three vehicles are close to each other, the expected routes decided by the driving destinations are overlapped, and the vehicle owner identity information represents that the vehicle owners may obtain the distal-end platoon service and the like, and then the three vehicles may be selected to form the vehicle platoon.

Step S630: the vehicles receiving the indication of the cloud server gather by adjusting information such as the speed and the lane, and drive to a range where direct communication may be performed.

In some embodiments, apart from indicating an appropriate speed and a lane to the vehicles, the cloud server may further indicate a gathering location to the vehicles. Alternatively, the gathering location may also be separately indicated to instruct the vehicles capable of performing platoon driving to drive to the location to form the vehicle platoon.

In some embodiments, after entering the range where direct communication may be performed, the vehicles may use a PC5 mechanism to form the vehicle platoon.

Step S640: The cloud server specifies vehicle roles (for example, specifying a head vehicle, a following vehicle and the like, or only the head vehicle may also be specified, and other vehicles are automatically changed into following vehicles), and instructs to perform communication on the basis of a direct communication interface manner to create the vehicle platoon to enter a cruise state.

Figure 7:
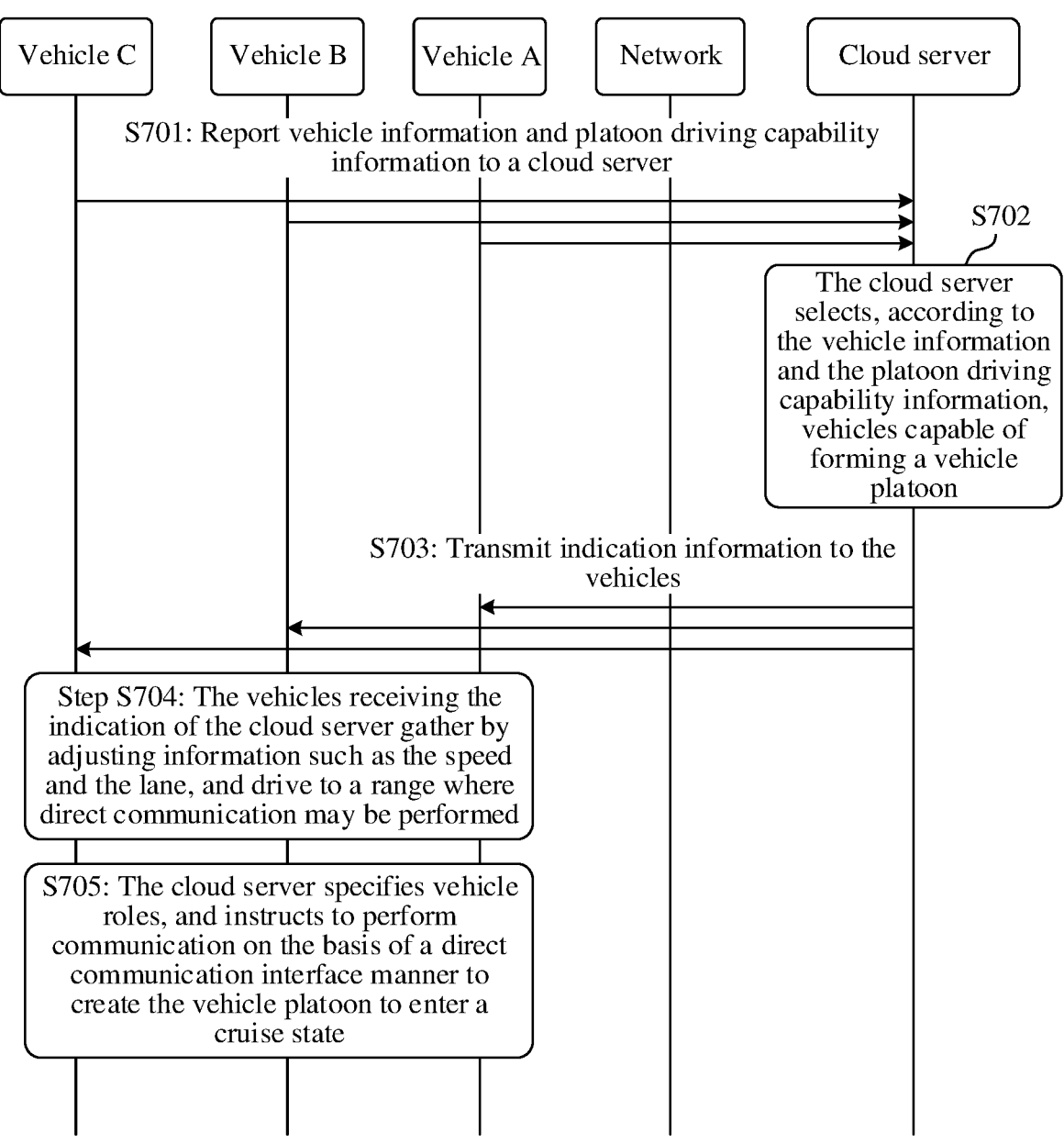
FIG. 7 is a flowchart of a platoon driving control method according to an embodiment of this application.

The specific execution procedure of the technical solution shown in FIG. 6 is as shown in FIG. 7, including the following steps:

step S701: Vehicles (e.g., vehicle A, vehicle B, and vehicle C) report vehicle information and platoon driving capability information to a cloud server, the vehicle information including information such as vehicle locations, speeds, and destinations.

In some embodiments, the vehicles may report the vehicle information and the platoon driving capability information to the cloud server through a V2X network or a 5G network, etc.

Step S702: The cloud server selects, according to the vehicle information and the platoon driving capability information, the vehicles capable of forming a vehicle platoon.

In some embodiments, the cloud server may select, on the basis of collected vehicle state information, the vehicle information, such as the current geographical locations, speeds, lanes, and driving destinations of the vehicles, and vehicle owner identity information (e.g., whether vehicle owners subscribe a platoon driving service), and the platoon driving capability information, the vehicles capable of forming the vehicle platoon.

Specifically, the geographical locations are close to each other, for example, being within a range of 2 Km, expected routes decided by the driving destinations are overlapped, and the vehicle owner identity information represents that the vehicle owners may obtain a distal-end platoon service and the like, and thus, this information may be selected as the conditions of performing platoon driving. In event that the geographical locations of three vehicles are close to each other, the expected routes decided by the driving destinations are overlapped, and the vehicle owner identity information represents that the vehicle owners may obtain the distal-end platoon service and the like, then the three vehicles may be selected to form the vehicle platoon.

Step S703: The cloud server transmits an indication to the selected vehicles capable of forming the vehicle platoon.

In some embodiments, the cloud server may indicate the speeds and the lane information to instruct the vehicle to gather by adjusting the speeds and the lane information. Of course, apart from indicating an appropriate speed and a lane to the vehicles, the cloud server may further indicate a gathering location to the vehicles. Alternatively, the gathering location may also be separately indicated to instruct the vehicles capable of performing platoon driving to drive to the location to form the vehicle platoon.

Step S704: the vehicles receiving the indication of the cloud server gather by adjusting information such as the speed and the lane, and drive to a range where direct communication may be performed.

In some embodiments, after entering the range where direct communication may be performed, the vehicles may use a PC5 mechanism to form the vehicle platoon.

Step S705: The cloud server specified vehicle roles, and instructs to perform communication on the basis of a direct communication interface manner to create the vehicle platoon to enter a cruise state.

In some embodiments of this application, the cloud server may be an edge cloud server, and/or may be a central cloud server. Where the cloud server is the edge cloud server, the edge cloud server and a roadside perception device may be the same physical object in some implementations, and may be different physical objects in other implementations.

According to the technical solution of the embodiment of this application, the cloud server may comprehensively assess, according to the related information (the vehicle state information and the expected driving routes, etc.) of the vehicles, the vehicles capable of performing platoon driving, and thus, the flexibility of platoon driving is improved, the traffic efficiency can be better optimized, and the requirements for various platoon driving scenarios can be satisfied.

The apparatus embodiments of this application are described below, and may be used for executing the platoon driving control method according to the aforementioned embodiments of this application. Reference may be made to the embodiments of the aforementioned platoon driving control method of this application for details that are not disclosed in the apparatus embodiments of this application.

Figure 8:
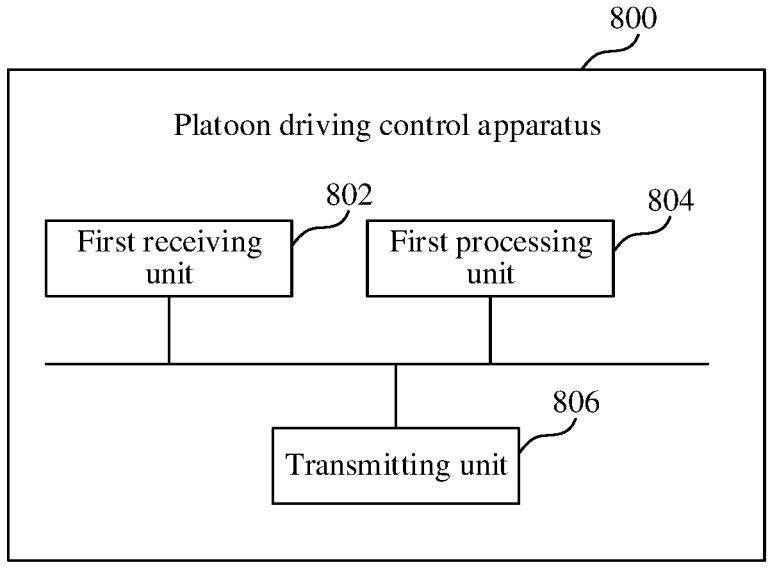
FIG. 8 is a block diagram of a platoon driving control apparatus according to an embodiment of this application.

FIG. 8 is a block diagram of a platoon driving control apparatus according to an embodiment of this application. The platoon driving control apparatus may be disposed in a server, and the server may be the cloud server shown in FIG. 1.

With reference to FIG. 8, the platoon driving control apparatus 800 according to one embodiment of this application includes: a first receiving unit 802, a first processing unit 804, and a transmitting unit 806.

The first receiving unit 802 is configured to receive vehicle state information reported by vehicles, the vehicle state information at least including platoon driving capability information of the vehicles; a first processing unit 804 is configured to determine, according to the platoon driving capability information of the vehicles and expected driving routes of the vehicles, a plurality of vehicles capable of performing platoon driving; and a transmitting unit 806 is configured to transmit a platoon driving control instruction to the plurality of vehicles to instruct the plurality of vehicles to form a vehicle platoon to perform platoon driving.

In some embodiments of this application, on the basis of the aforementioned solution, the platoon driving capability information is used for indicating whether the vehicles have a platoon driving capability. The first processing unit 804 is configured to: determine that the plurality of vehicles are capable of performing platoon driving in response to a determination, according to the platoon driving capability information of the vehicles, that the plurality of vehicles have the platoon driving capability and the expected driving routes of the plurality of vehicles are overlapped.

In some embodiments of this application, on the basis of the aforementioned solution, the platoon driving capability information is further used for indicating whether the vehicles allow platoon driving. The first processing unit 804 is configured to: determine that the plurality of vehicles are capable of performing platoon driving in response to a determination, according to the platoon driving capability information, that the plurality of vehicles have the platoon driving capability and the plurality of vehicles allow platoon driving, and the expected driving routes of the plurality of vehicles are overlapped.

In some embodiments of this application, on the basis of the aforementioned solution, the first processing unit 804 is configured to: determine target vehicles that subscribe a platoon driving service; and determine, according to the platoon driving capability information of the target vehicles and the expected driving routes of the target vehicles, the plurality of vehicles capable of performing platoon driving.

In some embodiments of this application, on the basis of the aforementioned solution, the first processing unit 804 is configured to: select, according to location information of the vehicles, vehicles with a distance therebetween being within a set range as candidate vehicles; and determine, according to the platoon driving capability information of the candidate vehicles and the expected driving routes of the candidate vehicles, the plurality of vehicles capable of performing platoon driving.

In some embodiments of this application, on the basis of the aforementioned solution, the control apparatus 800 further includes: a first obtaining unit, configured to receive the location information reported by the vehicles; or obtain road perception information, and obtain the location information of the vehicles according to the road perception information.

In some embodiments of this application, on the basis of the aforementioned solution, the transmitting unit 806 is configured to: separately transmit, to the plurality of vehicles, the control instruction comprising speed indication information and lane indication information, the speed indication information being used for instructing the plurality of vehicles to adjust driving speeds according to the speed indication information, and the lane indication information being used for instructing the plurality of vehicles to drive to a lane indicated by the lane indication information, so that the plurality of vehicles establish a communicative connection to form the vehicle platoon.

In some embodiments of this application, on the basis of the aforementioned solution, the transmitting unit 806 is configured to: transmit, to the plurality of vehicles, the control instruction comprising location indication information, the location indication information being used for instructing the plurality of vehicles to drive to a location indicated by the location indication information, so that the plurality of vehicles establish a communicative connection to form the vehicle platoon.

In some embodiments of this application, on the basis of the aforementioned solution, the control apparatus 800 further includes: a second obtaining unit, configured to receive the expected driving routes reported by the vehicles; or obtain the expected driving routes of the vehicles from a route planning server requested by the vehicles; or predict, according to recognized driving trajectories of the vehicles, the expected driving routes of the vehicles.

In some embodiments of this application, on the basis of the aforementioned solution, the transmitting unit 806 is further configured to transmit role indication information to the plurality of vehicles, the role indication information being used for indicating a role of a specified vehicle in the plurality of vehicles, and the role of the specified vehicle including a head vehicle.

Figure 9:
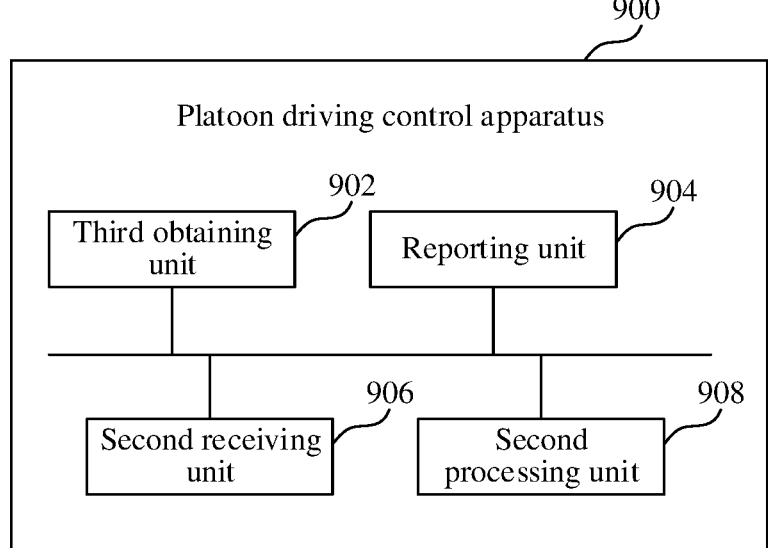
FIG. 9 is a block diagram of a platoon driving control apparatus according to an embodiment of this application.

FIG. 9 is a block diagram of a platoon driving control apparatus according to an embodiment of this application. The platoon driving control apparatus may be disposed in a vehicle.

With reference to FIG. 9, the platoon driving control apparatus 900 according to one embodiment of this application includes: a third obtaining unit 902, a reporting unit 904, a second receiving unit 906, and a second processing unit 908.

The third obtaining unit 902 is configured to obtain vehicle state information of vehicles, the vehicle state information at least including platoon driving capability information of the vehicles; the reporting unit 904 is configured to report the vehicle state information to a cloud server, so that the cloud server determines, according to the platoon driving capability information of the vehicles and expected driving routes of the vehicles, a plurality of vehicles capable of performing platoon driving; the second receiving unit 906 is configured to receive a platoon driving control instruction transmitted by the cloud server, the control instruction being transmitted by the cloud server after determining the plurality of vehicles; and the second processing unit 908 is configured to form, according to the control instruction, a vehicle platoon together with other vehicles in the plurality of vehicles to perform platoon driving.

Figure 10:
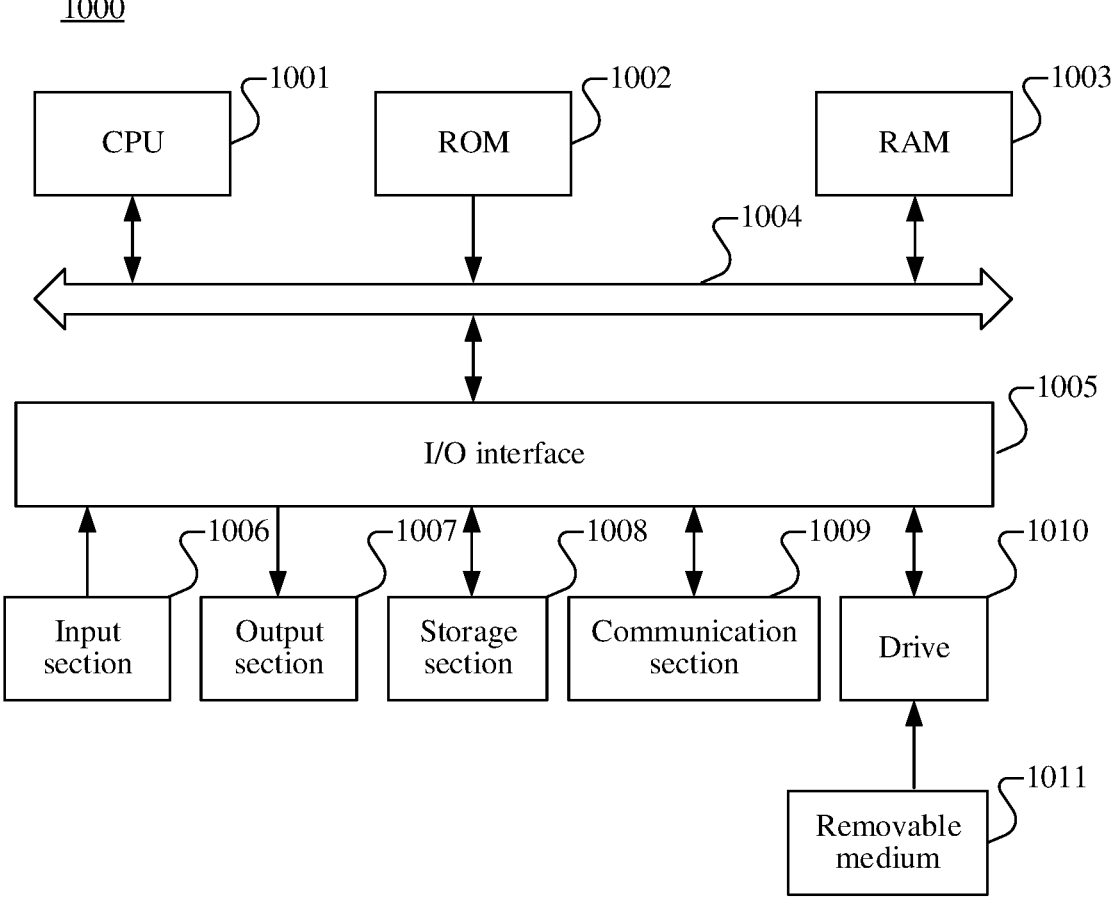
FIG. 10 is a schematic structural diagram of a computer system suitable for implementing an electronic device according to an embodiment of this application.

FIG. 10 is a schematic structural diagram of a computer system suitable for implementing an electronic device according to an embodiment of this application.

The computer system 1000 of the electronic device shown in FIG. 10 is merely an example, and does not constitute any limitation on functions and use ranges of the embodiments of this application.

As shown in FIG. 10, the computer system 1000 includes a central processing unit (CPU) 1001 which may perform various suitable actions and processing according to a program stored in a read-only memory (ROM) 1002 or a program loaded from a storage part 1008 into a random access memory (RAM) 1003, for example, performing the method according to the aforementioned embodiments. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following components are connected to an I/O interface 1005: an input part 1006 including a keyboard, a mouse, and the like; an output part 1007 including a cathode ray tube (CRT), a liquid crystal display (LCD), a speaker and the like; a storage part 1008 including a hard disk and the like; and a communication part 1009 of a network interface card such as a local area network (LAN) card and a modem. The communication part 1009 performs communication processing via a network such as the Internet. A driver 1010 is also connected to the I/O interface 1005 according to requirements. A removable medium 1011, such as a magnetic disk, an optical disc, a magneto-optical disk, or a semiconductor memory, is installed on the driver 1010 according to requirements, so that a computer program read from the removable medium is installed into the storage part 1008 according to requirements.

Particularly, according to an embodiment of this application, the processes described in the following by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed from a network through the communication part 1009, and/or installed from the removable medium 1011. When the computer program is executed by the CPU 1001, the various functions defined in the system of this application are executed.

The computer-readable medium shown in the embodiments of this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, the computer-readable signal medium may include a data signal transmitted in a baseband or as part of a carrier, the data signal carrying a computer-readable computer program. A data signal propagated in such a way may use a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: wireless, wired, etc., or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some alternative implementations, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described may also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the implementations of the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

What is claimed is:

1. A platoon driving control method, executed by a cloud server, the method comprising:

receiving vehicle state information reported by vehicles, the vehicle state information comprising platoon driving capability information of the vehicles, wherein the platoon driving capability information of the vehicles indicates the vehicles having a platoon driving capability and the vehicles allowing platoon driving;

determining, according to the platoon driving capability information of the vehicles and expected driving routes of the vehicles, a plurality of vehicles capable of performing platoon driving, wherein the expected driving routes of the vehicles are predicted according to recognized driving trajectories of the vehicles; and transmitting a platoon driving control instruction to the plurality of vehicles to instruct the plurality of vehicles for establishing a communication connection between the plurality of vehicles to form a vehicle platoon to perform platoon driving.

2. The platoon driving control method according to claim 1, wherein the platoon driving capability information is used to indicate whether the vehicles have a platoon driving capability; and the determining, according to the platoon driving capability information of the vehicles and the expected driving routes of the vehicles, the plurality of vehicles capable of performing platoon driving comprises:

determining that the plurality of vehicles are capable of performing platoon driving in response to a determination, according to the platoon driving capability information, that the plurality of vehicles have the platoon driving capability and the expected driving routes of the plurality of vehicles are overlapped.

3. The platoon driving control method according to claim 1, wherein the platoon driving capability information is used to indicate whether the vehicles allow platoon driving; and the determining, according to the platoon driving capability information of the vehicles and the expected driving routes of the vehicles, the plurality of vehicles capable of performing platoon driving comprises:

determining that the plurality of vehicles are capable of performing platoon driving in response to a determination, according to the platoon driving capability information, that the plurality of vehicles have the platoon driving capability, the plurality of vehicles allow platoon driving, and the expected driving routes of the plurality of vehicles are overlapped.

4. The platoon driving control method according to claim 1, wherein the determining, according to the platoon driving capability information of the vehicles and the expected driving routes of the vehicles, the plurality of vehicles capable of performing platoon driving comprises:

determining, according to the platoon driving capability information of target vehicles and the expected driving routes of the target vehicles, which vehicles are capable of performing platoon driving.

5. The platoon driving control method according to claim 1, wherein the determining, according to the platoon driving capability information of the vehicles and the expected driving routes of the vehicles, the plurality of vehicles capable of performing platoon driving comprises:

selecting vehicles that have a distance therebetween that is within a set range as a plurality of candidate vehicles, the selecting according to location information of the vehicles; and determining, according to the platoon driving capability information of the candidate vehicles and the expected driving routes of the candidate vehicles, the plurality of vehicles capable of performing platoon driving.

6. The platoon driving control method according to claim 5, further comprising:

receiving the location information reported by the candidate vehicles; or obtaining road perception information, and obtaining the location information of the candidate vehicles according to the road perception information.

7. The platoon driving control method according to claim 1, wherein the transmitting the platoon driving control instruction to the plurality of vehicles to instruct the plurality of vehicles to form the vehicle platoon to perform platoon driving comprises:

separately transmitting, to the plurality of vehicles, the control instruction comprising speed indication information and lane indication information, the speed indication information used to instruct the plurality of vehicles to adjust driving speeds according to the speed indication information, and the lane indication information used to instruct the plurality of vehicles to drive to a lane indicated by the lane indication information, so that the plurality of vehicles establish a communicative connection to form the vehicle platoon.

8. The platoon driving control method according to claim 1, wherein the transmitting the platoon driving control instruction to the plurality of vehicles to instruct the plurality of vehicles to form the vehicle platoon to perform platoon driving comprises:

transmitting, to the plurality of vehicles, the control instruction comprising location indication information, the location indication information used to instruct the plurality of vehicles to drive to a location indicated by the location indication information, so that the plurality of vehicles establish a communicative connection to form the vehicle platoon.

9. The platoon driving control method according to claim 1, further comprising:

transmitting role indication information to the plurality of vehicles, the role indication information used to indicate a role of a specified vehicle in the plurality of vehicles, and the role of the specified vehicle comprising a head vehicle.

10. A platoon driving control method, executed by a vehicle, the method comprising:

obtaining vehicle state information of the vehicle, the vehicle state information comprising platoon driving capability information of the vehicle, wherein the platoon driving capability information of vehicles indicates the vehicle having a platoon driving capability and the vehicle allowing platoon driving;

reporting the vehicle state information to a cloud server, so that the cloud server determines, according to the platoon driving capability information of the vehicle and an expected driving route of the vehicle, a plurality of vehicles capable of performing platoon driving, wherein the expected driving route of the vehicle is predicted according to recognized driving trajectories of the vehicle;

receiving a platoon driving control instruction transmitted by the cloud server for establishing a communication connection between the vehicle and other vehicles in the plurality of vehicles; and forming, according to the control instruction, a vehicle platoon together with other vehicles in the plurality of vehicles to perform platoon driving.

11. A platoon driving control apparatus, comprising:

a memory storing a plurality of instructions; and a processor configured to execute the plurality of instructions, and upon execution of the plurality of instructions, is further configured to:

receive vehicle state information reported by vehicles, the vehicle state information comprising platoon driving capability information of the vehicles, wherein the platoon driving capability information of the vehicles indicates the vehicles having a platoon driving capability and the vehicles allowing platoon driving;

determine, according to the platoon driving capability information of the vehicles and expected driving routes of the vehicles, a plurality of vehicles capable of performing platoon driving, wherein the expected driving routes of the vehicles are predicted, according to recognized driving trajectories of the vehicles; and transmit a platoon driving control instruction to the plurality of vehicles to instruct the plurality of vehicles for establishing a communication connection between the plurality of vehicles to form a vehicle platoon to perform platoon driving.

12. The platoon driving control apparatus according to claim 11, wherein the platoon driving capability information is used to indicate whether the vehicles have a platoon driving capability, and in order to determine, according to the platoon driving capability information of the vehicles and the expected driving routes of the vehicles, the plurality of vehicles capable of performing platoon driving, the processor, upon execution of the plurality of instructions, is further configured to:

determine that the plurality of vehicles are capable of performing platoon driving in response to a determination, according to the platoon driving capability information of the vehicles, that the plurality of vehicles have the platoon driving capability and the expected driving routes of the plurality of vehicles are overlapped.

13. The platoon driving control apparatus according to claim 11, wherein the platoon driving capability information is used to indicate whether the vehicles allow platoon driving, and in order to determine, according to the platoon driving capability information of the vehicles and the expected driving routes of the vehicles, the plurality of vehicles capable of performing platoon driving, the processor, upon execution of the plurality of instructions, is further configured to:

determine that the plurality of vehicles are capable of performing platoon driving in response to a determination, according to the platoon driving capability information, that the plurality of vehicles have the platoon driving capability and the plurality of vehicles allow platoon driving, and the expected driving routes of the plurality of vehicles are overlapped.

14. The platoon driving control apparatus according to claim 11, wherein the determining, according to the platoon driving capability information of the vehicles and the expected driving routes of the vehicles, the plurality of vehicles capable of performing platoon driving comprises:

determining, according to the platoon driving capability information of target vehicles and the expected driving routes of the target vehicles, the plurality of vehicles capable of performing platoon driving.

15. The platoon driving control apparatus according to claim 11, wherein in order to determine, according to the platoon driving capability information of the vehicles and the expected driving routes of the vehicles, the plurality of vehicles capable of performing platoon driving, the processor, upon execution of the plurality of instructions, is further configured to:

select vehicles that have a distance therebetween that is within a set range as candidate vehicles, the selecting according to location information of the vehicles; and determine, according to the platoon driving capability information of the candidate vehicles and the expected driving routes of the candidate vehicles, the plurality of vehicles capable of performing platoon driving.

16. The platoon driving control apparatus according to claim 15, wherein the processor, upon execution of the plurality of instructions, is further configured to:

receive the location information reported by the vehicles; or obtain road perception information, and obtain the location information of the vehicles according to the road perception information.

17. The platoon driving control apparatus according to claim 11, wherein in order to transmit the platoon driving control instruction to the plurality of vehicles to instruct the plurality of vehicles to form the vehicle platoon to perform platoon driving, the processor, upon execution of the plurality of instructions, is further configured to:

separately transmit, to the plurality of vehicles, the control instruction comprising speed indication information and lane indication information, the speed indication information used to instruct the plurality of vehicles to adjust driving speeds according to the speed indication information, and the lane indication information used to instruct the plurality of vehicles to drive to a lane indicated by the lane indication information, so that the plurality of vehicles establish a communicative connection to form the vehicle platoon.

18. The platoon driving control apparatus to claim 11, wherein in order to transmit the platoon driving control instruction to the plurality of vehicles to instruct the plurality of vehicles to form the vehicle platoon to perform platoon driving, the processor, upon execution of the plurality of instructions, is further configured to:

transmit, to the plurality of vehicles, the control instruction comprising location indication information, the location indication information used to instruct the plurality of vehicles to drive to a location indicated by the location indication information, so that the plurality of vehicles establish a communicative connection to form the vehicle platoon.

19. The platoon driving control apparatus according to claim 11, wherein the processor, upon execution of the plurality of instructions, is further configured to:

receive the expected driving routes reported by the vehicles; or obtain the expected driving routes of the vehicles from a route planning server requested by the vehicles; or predict, according to recognized driving trajectories of the vehicles, the expected driving routes of the vehicles.

* * * * *